July 21, 1964    J. R. RAIRDEN III    3,141,798
ANODIZATION OF ALUMINUM IN A SOLUTION OF CALCIUM HYDROXIDE
Filed Nov. 28, 1961

Inventor:
John R. Rairden,
by Richard A. Speer
His Attorney.

3,141,798
ANODIZATION OF ALUMINUM IN A SOLUTION
OF CALCIUM HYDROXIDE
John R. Rairden III, Latham, N.Y., assignor to General Electric Company, a corporation of New York
Filed Nov. 28, 1961, Ser. No. 155,374
1 Claim. (Cl. 148—6.27)

This invention relates to metal oxide coatings and more particularly to tightly-adherent oxide coatings formed on bodies of aluminum and aluminum-base alloys and to methods for producing such coatings.

This application is a continuation-in-part of applicant's copending application, S.N. 824,212, filed July 1, 1959, and assigned to the same assignee as the present invention, now abandoned.

Technological advances in the field of aluminum metallurgy have brought about increased use of aluminum in a variety of applications, both by improving the mechanical qualities of the material and by reducing the cost to the consumer. Problems remain, however, in instances where the aluminum or aluminum-base alloy must have a substantially impervious, tightly-adherent film on the exposed surfaces thereof. For example, in high temperature water, the corrosion rate of aluminum is such as to preclude its general use. Similarly, it is possible to use aluminum-base electrical conductors without the usual organic insulating coating, provided that an integral film can be produced on the outer surfaces thereof which is sufficiently dielectric and resistant to cracking or spalling. Additionally, aluminum has been used with decorative finishes, such as enamels or paints applied to the exposed surfaces. In these instances, it is apparent that integral bonding between the base and the finishes is important in achievement of a successful commercial product.

It is a principal object of this invention to provide aluminum and aluminum-base alloy bodies having substantially impervious, tightly-adherent oxide films formed integrally on the exposed surfaces thereof.

An additional object of this invention is to provide aluminum and aluminum-base alloy bodies having an oxide film on the exposed surfaces thereof which have good dielectric properties.

A further object of this invention is to provide a method for producing tightly-adherent oxide films on the exposed surfaces of aluminum and aluminum-base alloy bodies.

Other objects and advantages of this invention will be in part obvious and in part explained by reference to the accompanying specification and drawings.

Figure 1:
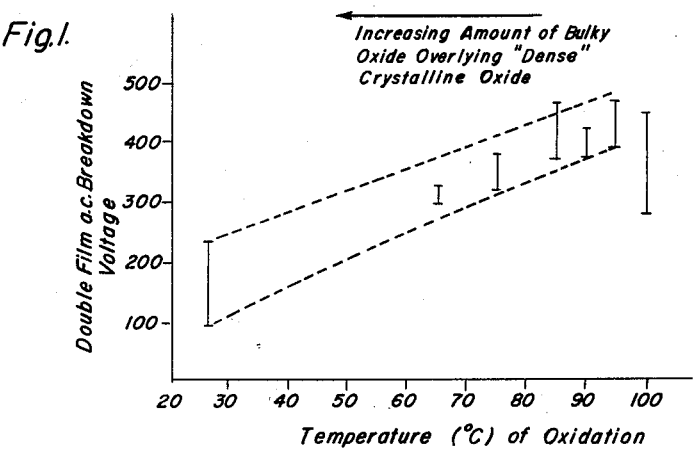
Figure 2:
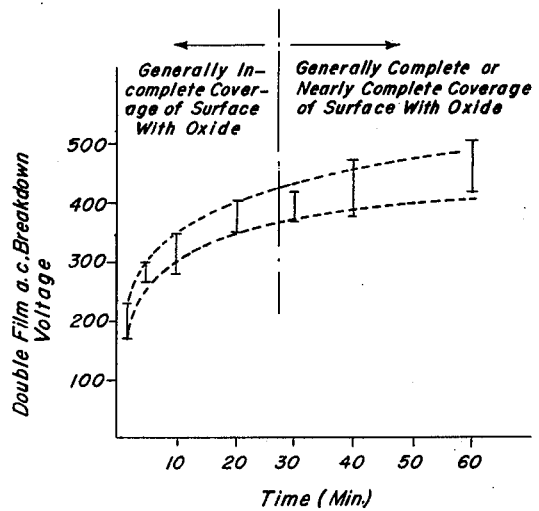

FIG. 1 is a graph showing the breakdown voltages of various oxide films as a function of the oxidation temperature; and FIG. 2 is a graph similar to that of FIG. 1 in which the breakdown voltages are measured as functions of oxidation times at constant temperature.

Generally, the bodies of the present invention consist of a matrix metal selected from the group consisting of aluminum and aluminum alloys and an adherent oxide film on the exposed surface thereof which contains calcium oxide, aluminum oxide and water of hydration. The method for producing the film comprises subjecting the exposed surfaces of the aluminum or aluminum-base bodies to a saturated solution of calcium hydroxide containing not less than about one gram of aluminum per liter dissolved therein to form the tightly-adherent film.

The metals with which the present invention is principally concerned are electrical grade aluminum, which generally contains normally no more than about 0.1 or 0.2 percent impurities and added elements, commercial aluminum which is normally about 99.2 percent pure, with about 0.8 percent incidental impurities and alloying agents, and aluminum-base alloys which are widely used in commerce today. The latter group includes alloys such as "24S," which consists of about 4.5 percent copper, 1.5 percent magnesium, 0.6 percent manganese and the remainder substantially all aluminum. The principal alloying agents which are added to aluminum are copper, silicon, manganese, chrome, magnesium and zinc, although others may be added to obtain special properties in the final product.

As already mentioned, the films of the present invention are made up of: (1) oxides of calcium which metal is present in the treating solution as a hydroxide; (2) aluminum oxide; and (3) water of hydration.

The present method generally involves subjecting the exposed surfaces of aluminum and aluminum-base alloy bodies of selected compositions to a solution of calcium hydroxide containing not less than one gram of dissolved aluminum per liter of hydroxide solution. The hydroxide solution is desirably provided with an excess of $Ca(OH)_2$, the excess calcium thus provided acting as a source of calcium ions to replace those removed from solution by incorporation in the oxide coating formed on the aluminum. That is, since the solubility of $Ca(OH)_2$ in water at 100° C. is on the order of 0.77 gm./liter, amounts of $Ca(OH)_2$ in excess of those which can be dissolved, for example 5 grams, are added for each liter of water used. Thus, a supply of calcium is always present to replenish the solution and maintain it in a saturated condition.

The solutions are basically aqueous solutions in which the pH is regulated to fall within the range of from about 10 to 10.8 or 10.9. Regulation of the pH essentially to within the stated range is essential to obtaining a proper film on the aluminum body, it having been found that the pHs' of 9 and 11 do not permit formation of an acceptable, insulating oxide film. The normal way for obtaining a usable solution is to dissolve the required amount of calcium hydroxide in water and then add a sufficient amount of aluminum, which goes into solution, to adjust the pH to within the proper range. The solution effectiveness varies as a function of the amount of aluminum that has been dissolved. For example, a solution containing no dissolved aluminum acts only to etch the aluminum, whereas one containing from about 1.0 to 1.5 grams dissolved aluminum per liter, as a minimum, will act to form a tightly adherent insulating film. Use of the aluminum ion in regulating or buffering the pH also prevents dissolution of aluminum bodies that are being treated, since this is the normal action in an unbuffered solution. In a solution containing not less than about 1.0 to 1.5 grams of dissolved aluminum per liter, the pH remains constant at about 10.1 and is therefore effective in producing an insulating film.

Calcium forms a thin, tightly-adherent film on the aluminum body which has preferred properties. Even though an excess amount of calcium hydroxide is added to water, the pH of the solution can be easily adjusted by providing a sufficient amount of aluminum ion. Thereafter, no further regulation of the solution is necessary.

Several calcium hydroxide solutions were prepared, as just outlined, heated to 90° C. and aluminum bodies immersed for periods of time sufficient to permit the formation of the desired oxide film. Each of the solutions had its pH adjusted to about 10.1 by the addition of aluminum and all samples showed a weight gain, these gains evidencing the formation of oxide films. In this particular instance, the basic material used was commercially pure aluminum, the resulting oxide film, therefore, being made up of an oxide of calcium, aluminum oxide and water of hydration. The resulting film was analyzed and its composition was $3CaO.Al_2O_3.6H_2O$.

The solution temperature is an important parameter in obtaining insulating oxide films. It can be seen from FIG. 1 of the drawings that for 30 minute oxidation treatments the higher the solution temperature the greater the dielectric breakdown strength of the oxide formed, except at boiling temperatures. Possibly the agitation due to gas bubbling in the boiling solution retards the formation of an adherent, uniform oxide.

By miscroscopically examining the surfaces of the samples, it was possible to determine that at 95° C. a dense, uniform oxide is formed on the aluminum. As the temperature of oxidation is decreased, a bulky appearing oxide forms on top of the dense oxide and the amount of bulky oxide increases as the temperature decreases. Also, overall coverage of the aluminum becomes less complete with decreasing temperature. From weight gain measurements, it was determined that the total amount of oxide formed in a given period of time decreases with decreasing temperature.

Variation of the time periods during which the aluminum specimens were immersed in calcium hydroxide solution, made it possible to determine that complete oxide coverage of the specimens was effected after 20 to 30 minutes. Thus, the optimum solution temperature for the formation of an insulating oxide film was found to be from about 85 to 95° C. and the optimum time not less than about 20 to 30 minutes.

The effect of time on the formation of oxide film is clearly shown in FIG. 2 of the drawings which indicates that, as a general matter, films of sufficient dielectric strength are obtained when the samples are immersed for not less than about 20 minutes. It is apparent from the drawing that the highest breakdown strength was obtained when immersion was effected for 60 minutes.

It was found that an oxide forms somewhat more rapidly on the surface of aluminum as it is galvanically coupled to a cathode which is inert to the treating solution. In most instances, galvanically formed oxide films were obtained by coupling the aluminum samples to stainless steel cathodes. Whether or not the sample is galvanically coupled, the driving force is the chemical reaction and has a potential of approximately 1.5 volts on the hydrogen scale of aluminum oxidized to the trivalent state. In effect, this is a reaction where the aluminum being oxidized is anodic and the sites of hydrogen discharge are cathodic. Galvanically coupling the aluminum to stainless steel, or any other inert cathodic material, might be expected to permit the cathode reaction to take place only at the stainless steel rather than at cathodic sites on the aluminum. The experiments indicated that even with galvanic coupling, there are still many active cathodic sites at the aluminum surface as evidenced by vigorous gas evolution from the surface.

Considering some specific examples, films were produced with the use of galvanic couples in saturated calcium hydroxide solutions adjusted by additions of aluminum to fall within the pH range of from 10 to 10.9. Various samples of electrical conductivity grade aluminum were used and films formed which had the composition $3CaO.Al_2O_3.6-8H_2O$. These films were formed after 30 minutes in the solution at 90° C. The breakdown voltages were between 350 and 500 D.-C. volts.

Bodies which have been treated in a manner causing the film to have 6 to 8 mol percent water of hydration are extremely useful for bonding on decorative or protective layers. Obviously, alloys other than electrical grade aluminum will contain oxides of all the metals present in the matrix material as well as the oxide of the metal forming the hydroxide. The decompositions of these films are extremely difficult to determine so that no accurate analysis could be made. In any event, the calcium solution is the preferred solution, as already mentioned, due to the better and more integral film which is formed and due to the easier handling involved.

What I claim as new and desire to secure by Letters Patent of the United States is:

A method for forming a tightly-adherent oxide film on an exposed surface of a metal body of a matrix metal selected from the group consisting of aluminum and aluminum alloys containing not less than about 90 percent aluminum comprising, contacting the exposed surface with a saturated aqueous solution of calcium hydroxide containing not less than about one gram of dissolved aluminum per liter, the solution being heated to a temperature of not less than about 85° C., maintaining the pH of the hydroxide solution to within the range of from about 10 to 10.2 and continuing the contact between the exposed surface of the metal body and the hydroxide solution for sufficient time to form an oxide coating consisting of an oxide of the metal of the hydroxide solution, aluminum oxide, and water of hydration.

References Cited in the file of this patent

UNITED STATES PATENTS 2,472,304    Mason ------------------ June 7, 1949

FOREIGN PATENTS 393,565    Great Britain ------------ Sept. 3, 1931